United States Patent
Hyodo et al.

(10) Patent No.: US 11,371,213 B2
(45) Date of Patent: Jun. 28, 2022

(54) WHEEL LOADER

(71) Applicant: Hitachi Construction Machinery Co., Ltd., Tokyo (JP)

(72) Inventors: Koji Hyodo, Ibaraki (JP); Tetsuji Tanaka, Chiba (JP); Isamu Aoki, Ibaraki (JP); Kouji Shimazaki, Hyogo (JP); Jumpei Kamiya, Hyogo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 364 days.

(21) Appl. No.: 16/640,437

(22) PCT Filed: Dec. 26, 2018

(86) PCT No.: PCT/JP2018/047839
§ 371 (c)(1),
(2) Date: Feb. 20, 2020

(87) PCT Pub. No.: WO2019/131758
PCT Pub. Date: Jul. 4, 2019

(65) Prior Publication Data
US 2020/0208377 A1 Jul. 2, 2020

(30) Foreign Application Priority Data
Dec. 28, 2017 (JP) .............................. JP2017-253978

(51) Int. Cl.
*E02F 9/22* (2006.01)
*E02F 9/20* (2006.01)

(52) U.S. Cl.
CPC .......... *E02F 9/2253* (2013.01); *E02F 9/2079* (2013.01); *E02F 9/2246* (2013.01);
(Continued)

(58) Field of Classification Search
CPC ....... E02F 9/029; E02F 9/2079; E02F 9/2246; E02F 9/2253; E02F 9/2296
See application file for complete search history.

(56) References Cited

U.S. PATENT DOCUMENTS

| | | | | |
|---|---|---|---|---|
| 7,637,039 B2 * | 12/2009 | Toda | ...................... | E02F 9/2296 60/446 |
| 8,315,783 B2 * | 11/2012 | Hyodo | .................... | F02D 29/02 123/319 |

(Continued)

FOREIGN PATENT DOCUMENTS

| | | |
|---|---|---|
| JP | 11-132154 A | 5/1999 |
| JP | 2006-77451 A | 3/2006 |
| WO | WO 2009/054499 A1 | 4/2009 |

OTHER PUBLICATIONS

International Search Report (PCT/ISA/210) issued in PCT Application No. PCT/JP2018/047839 dated Apr. 2, 2019 with English translation (three (3) pages).

(Continued)

*Primary Examiner* — Michael Leslie
(74) *Attorney, Agent, or Firm* — Crowell & Moring LLP

(57) ABSTRACT

Provided is a wheel loader capable of moving up a lift arm in a short time during excavation work. A wheel loader comprises a controller configured to control maximum traction force of the wheel loader and input torque of a working device hydraulic pump, and include a specific condition determination section configured to determine whether a specific condition for specifying excavation work is satisfied, an elapsed time measurement section configured to measure an elapsed time from start of the excavation work, and an input torque control section configured to limit the input torque to a first input torque value when the specific (Continued)

condition is satisfied and increase the input torque from the first input torque value when a second set time elapses from the elapse of a first set time.

7 Claims, 14 Drawing Sheets

(52) U.S. Cl.
CPC ....... *E02F 9/2296* (2013.01); *B60Y 2200/415* (2013.01); *E02F 9/2235* (2013.01); *F02D 2200/501* (2013.01); *F02D 2200/602* (2013.01)

(56) References Cited

U.S. PATENT DOCUMENTS

| | | | |
|---|---|---|---|
| 8,777,808 B2* | 7/2014 | Hyodo .................. | E02F 9/2079 477/181 |
| 9,631,345 B2* | 4/2017 | Tanaka .................. | F16H 61/421 |
| 10,895,062 B2* | 1/2021 | Hyodo .................. | E02F 9/2253 |
| 10,920,399 B2* | 2/2021 | Oasa ........................ | E02F 9/02 |
| 10,947,701 B2* | 3/2021 | Hyodo .................. | E02F 9/2253 |
| 2010/0262353 A1 | 10/2010 | Hyodo et al. | |
| 2021/0189690 A1* | 6/2021 | Hyodo .................. | E02F 9/2246 |

OTHER PUBLICATIONS

Japanese-language Written Opinion (PCT/ISA/237) issued in PCT Application No. PCT/JP2018/047839 dated Apr. 2, 2019 (three (3) pages).

\* cited by examiner

STEP-ON AMOUNT OF ACCELERATOR PEDAL [%]

LIFTING OPERATION AMOUNT OF LIFT ARM [%]

WHEEL LOADER

TECHNICAL FIELD

The present invention relates to a wheel loader for excavating earth and sand, minerals, etc. and performing object handling by loading an excavated object onto such as a dump truck.

BACKGROUND ART

At the time of performing excavation work by a wheel loader, if the traction force (traveling drive force) is great, the reaction force acting on a lift arm when the bucket is thrust into an object to be excavated such as earth and sand, minerals, etc. becomes great. The reaction force becomes a resistance and disturbs a lifting operation of the lift arm, and as a result, the lifting force of the lift arm is decreased. Accordingly, at the time of performing excavation work, technique for adjusting balance between the traction force and the lifting force of the lift arm is required.

For example, Patent Literature 1 discloses a wheel loader on which a torque converter type traveling drive system is mounted, and this wheel loader is configured to, when a condition for satisfying an excavation state is continuously satisfied for a predetermined time, decrease a limit value of the maximum rotational speed of an engine with a lapse of time so as to limit the traction force. In such a wheel loader, the traction force is suppressed at the time of performing excavation work to improve the workability.

CITATION LIST

Patent Literature

Patent Literature 1: WO/2009/054499

SUMMARY OF INVENTION

Technical Problem

The excavation work can be roughly divided into three types of work, such as work of thrusting a bucket into an object to be excavated, work of scooping an excavated object with a bucket, and work of lifting a bucket in a state in which the excavated object is loaded thereon. Among these types of work, the work of lifting the bucket is required to be performed in as a short time as possible. However, the wheel loader according to Patent Literature 1 is configured to merely decrease the traction force gradually to a predetermined limit value with a lapse of time when the work of scooping the excavated object with the bucket is started, and accordingly, it is difficult to quickly move up the lift arm to which load of the object in the bucket is applied during the work of lifting the bucket. In this case, it takes time until the lift arm is lifted to the top, in other words, it takes time until the bucket moves up, which lowers the work efficiency.

An objective of the present invention is to provide a wheel loader capable of moving up a lift arm in a short time during excavation work.

Solution to Problem

In order to achieve the objective described above, a wheel loader according to the present invention is configured to comprises: a vehicle body; a plurality of wheels provided on the vehicle body; an engine provided on the vehicle body; a traveling drive device configured to transmit power from the engine to the plurality of wheels to make the vehicle body travel; a variable displacement working device hydraulic pump driven by the engine; and a front working device provided on a front portion of the vehicle body and driven by hydraulic oil supplied from the working device hydraulic pump, wherein the wheel loader further comprises: a traveling state sensor configured to detect a traveling state of the wheel loader; an operation state sensor configured to detect an operation state of the front working device; and a controller configured to control maximum traction force of the wheel loader and input torque of the working device hydraulic pump, respectively, wherein the controller includes: a specific condition determination section configured to determine whether a specific condition for specifying excavation work performed by the wheel loader is satisfied based on the traveling state detected by the traveling state sensor and the operation state detected by the operation state sensor; an elapsed time measurement section configured to measure an elapsed time from start of the excavation work performed by the wheel loader; a traction force control section configured to control the maximum traction force of the wheel loader; and an input torque control section configured to control the input torque of the working device hydraulic pump, wherein the traction force control section is configured to, in a case where the specific condition determination section determines that the specific condition is satisfied and the elapsed time measurement section measures that a predetermined first set time has elapsed from the start of the excavation work, limit the maximum traction force of the wheel loader to a predetermined first limit value with a lapse of time while a predetermined second set time elapses from the elapse of the predetermined first set time, and wherein the input torque control section is configured to: in a case where the specific condition determination section determines that the specific condition is satisfied, limit the input torque of the working device hydraulic pump to a predetermined first input torque value; and in a case where the elapsed time measurement section measures that the predetermined second set time has elapsed further from the elapse of the predetermined first set time, limit the input torque of the working device hydraulic pump from the predetermined first input torque value to a predetermined second input torque value which is greater than the predetermined first input torque value.

Advantageous Effects of Invention

According to the wheel loader of the present invention, it is possible to move up a lift arm in a short time during excavation work. The problems, configurations, and effects other than those described above will be clarified by explanation of the embodiments below.

DESCRIPTION OF EMBODIMENTS

Hereinafter, the overall configuration and operations of a wheel loader according to each embodiment of the present invention will be described with reference to FIGS. 1 to 3.

Figure 1:
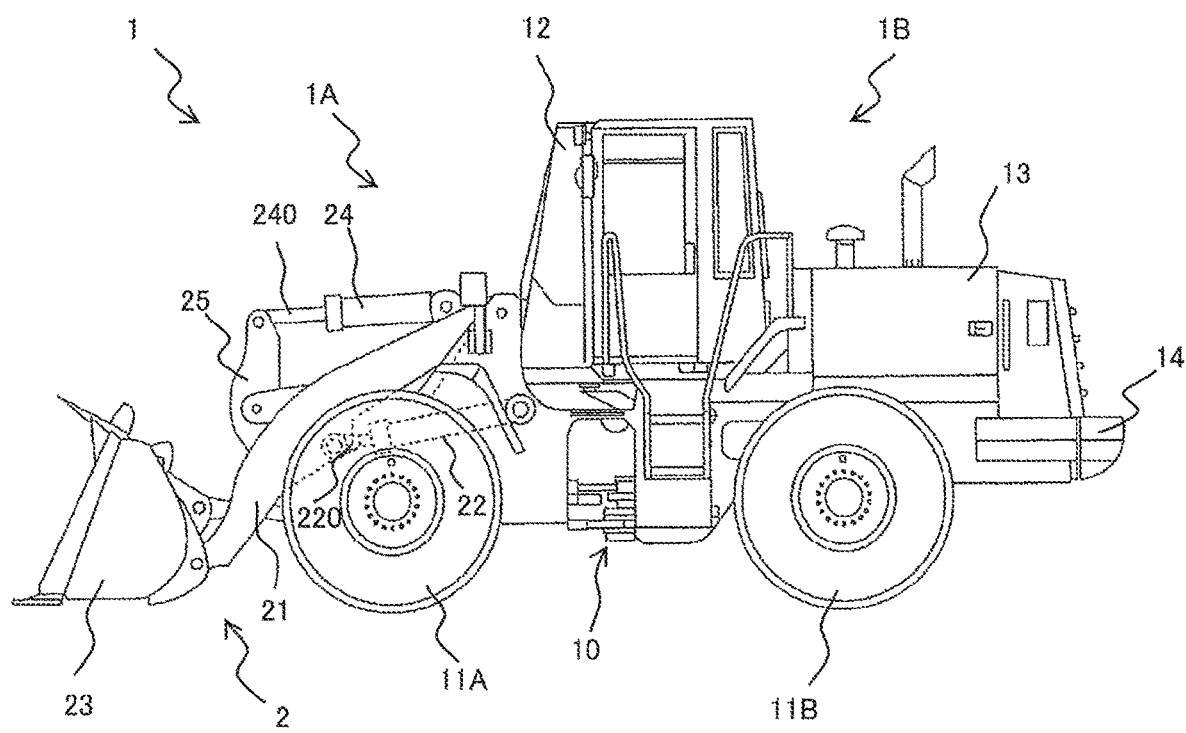
FIG. 1 is a side view illustrating appearance of a wheel loader according to each embodiment of the present invention.

FIG. 1 is a side view illustrating appearance of a wheel loader 1 according to each embodiment of the present invention. FIG. 2 is a schematic diagram illustrating a layout in an operator's cab. FIGS. 3(a) to 3(c) explains excavation work performed by the wheel loader 1.

The wheel loader 1 includes a vehicle body constituted by a front frame 1A and a rear frame 1B, and a front working device 2 provided on a front portion of the vehicle body. The wheel loader 1 is an articulated type work vehicle which is swiveled on a central portion of the vehicle body and steered thereby. The front frame 1A and the rear frame 1B are connected to each other by a center joint 10 to swivel in the left and right direction so that the front frame 1A is bent in the left and right direction with respect to the rear frame 1B.

The front frame 1A is provided with a pair of left and right front wheels 11A and a front working device 2. The rear frame 1B is provided with a pair of left and right rear wheels 11B, an operator's cab 12 in which an operator works, a mechanical room 13 in which devices such as an engine, a controller, and a cooler are accommodated, and a counterweight 14 for maintaining balance so that the vehicle body does not tilt.

In the following, regarding the left and right direction of the wheel loader 1, the left direction as viewed from the operator seated on a seat 121 (see FIG. 2) of the operator's cab 12 will be referred to as the "left direction" and the right direction as viewed therefrom will be referred to as the "right direction". FIG. 1 illustrates only the left front wheel 11A and the left rear wheel 11B among the pair of left and right front wheels 11A and rear wheels 11B.

The front working device 2 includes a lift arm 21 capable of being rotated in the vertical direction, a pair of lift arm cylinders 22 configured to expand and contract to drive the lift arm 21, a bucket 23 attached to the tip of the lift arm 21, a bucket cylinder 24 configured to expand and contract to make the bucket 23 rotate in the vertical direction with respect to the lift arm, a bell crank 25 rotatably connected to the lift arm 21 to constitute a link mechanism between the bucket 23 and the bucket cylinder 24, and a plurality of pipes (not illustrated) for guiding pressure oil to the pair of lift arm cylinders 22 and the bucket cylinder 24. FIG. 1 illustrates only one of the pair of lift arm cylinders 22, which is disposed on the left side, by indicating it with a broken line.

The lift arm 21 is rotated upward by extension of rods 220 of each of the lift arm cylinders 22, and rotated downward by contraction of each of the rods 220. The bucket 23 is rotated upward (tilting) with respect to the lift arm 21 by extension of a rod 240 of the bucket cylinder 24, and rotated downward (dumping) with respect to the lift arm 21 by contraction of the rod 240.

Figure 2:
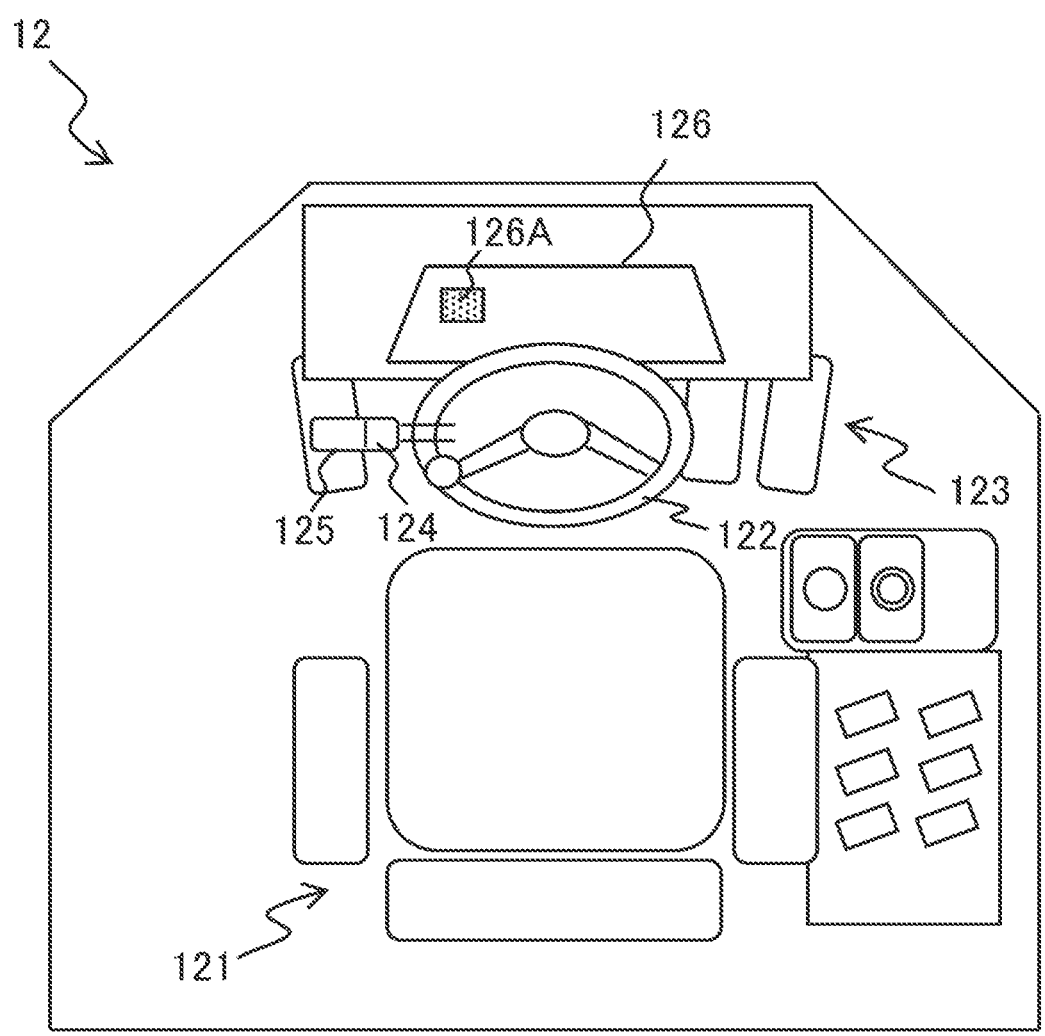
FIG. 2 is a schematic diagram illustrating a layout in an operator's cab.
Figure 3A:
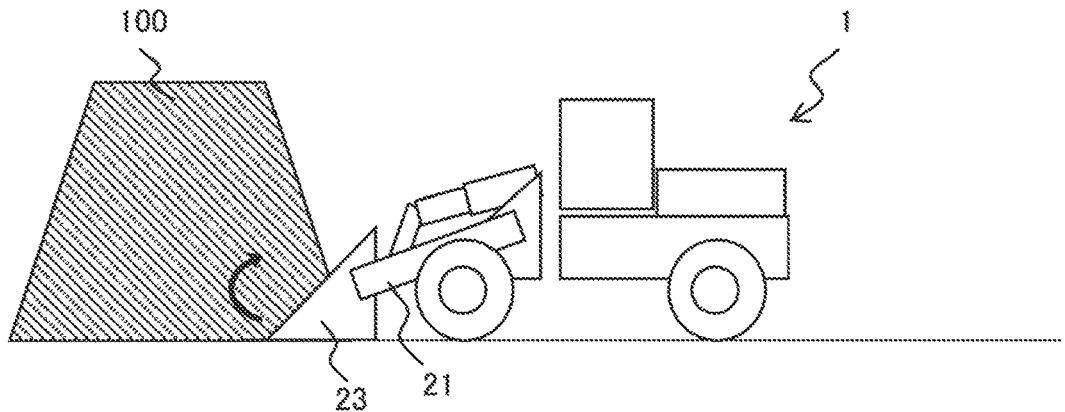
FIGS. 3A to 3C explain excavation work performed by a wheel loader.
Figure 3B:
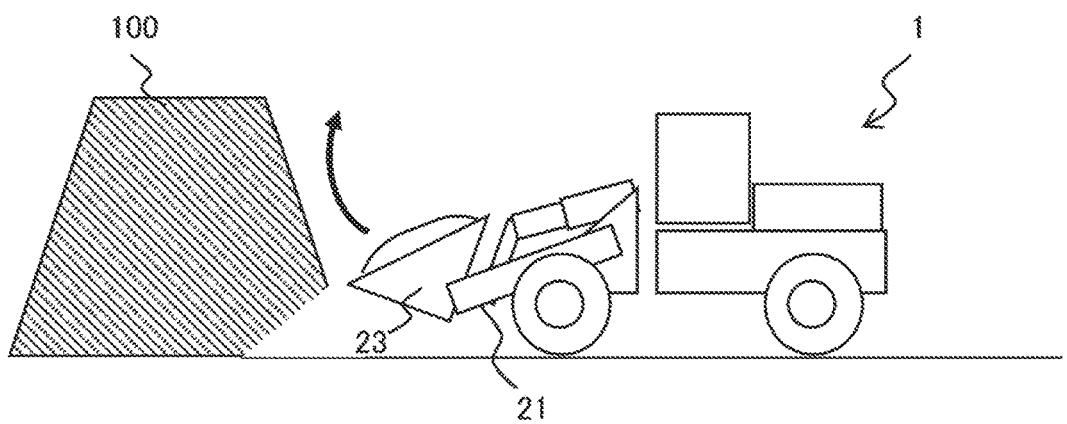
Figure 3C:
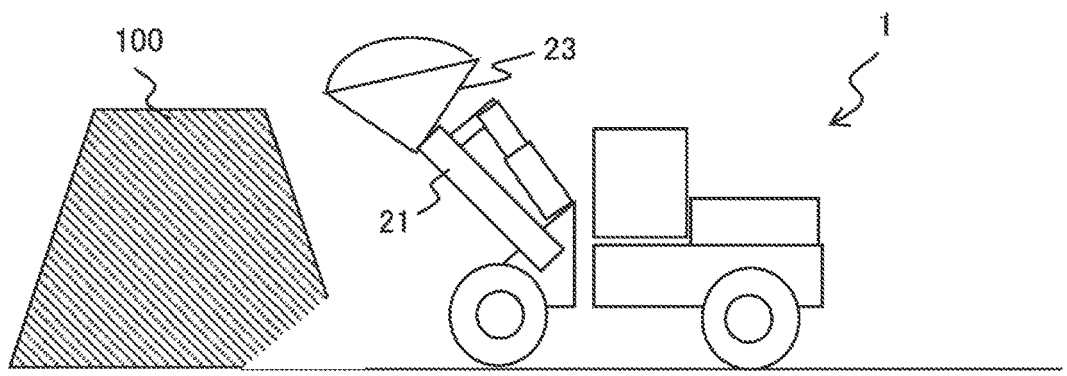

As illustrated in FIG. 2, the operator's cab 12 is provided with the seat 121 on which an operator is seated, a handle 122 disposed on a front portion of the seat 121 and used for steering the vehicle body in the left and right direction, an accelerator pedal 123 for making the vehicle body travel, a forward/reverse changeover switch 124 for switching the movement of the vehicle body between forward, stopping, and reverse, a shift switch 125 for selecting a speed stage of the vehicle body, and a monitor 126 disposed on a further front portion from the handle 122 and serving as a display device for displaying such as a traveling state of the vehicle body and an operation state of the front working device 2.

In the present embodiment, the monitor 126 includes a display unit 126A for displaying information on the maximum traction force of the wheel loader 1 and input torque of a working device hydraulic pump 43 (see FIG. 4) which supplies hydraulic oil for driving the front working device 2. The display unit 126A can notify the operator of predetermined restriction states of the wheel loader 1 by, for example, lighting red when the maximum traction force of the wheel loader 1 is limited, and flashing red when the input torque of the working device hydraulic pump 43 is limited.

The wheel loader 1 is a work vehicle which is used, for example in a strip mine, to excavate earth and sand, minerals, etc. and perform object handling for loading them onto such as a dump truck. In the excavation work, firstly, the wheel loader 1 advances at full throttle toward the ground 100 which is an object to be excavated, and thrusts the bucket 23 into the ground 100 (the state illustrated in FIG. 3(a)). Secondly, the wheel loader 1 makes the bucket 23 tilt to scoop up an excavated object (the state illustrated in FIG. 3(b)). Thirdly, the wheel loader 1 performs a lifting operation of the lift arm 21 in order to move the bucket 23 upward in a state in which the excavated object is loaded thereon (the state illustrated in FIG. 3(c)). A series of work illustrated in FIGS. 3(a) to 3(c) is referred to as "excavation work".

Hereinafter, a drive system of the wheel loader 1 will be described for each embodiment.

First Embodiment

The drive system of the wheel loader 1 according to the first embodiment will be described with reference to FIGS. 4 to 13.

Configuration of Traveling Drive Device 4

Within the drive system of the wheel loader 1 according to the present embodiment, firstly, the configuration of a traveling drive device 4 as a traveling drive system of the vehicle body will be described with reference to FIGS. 4 to 6.

Figure 4:
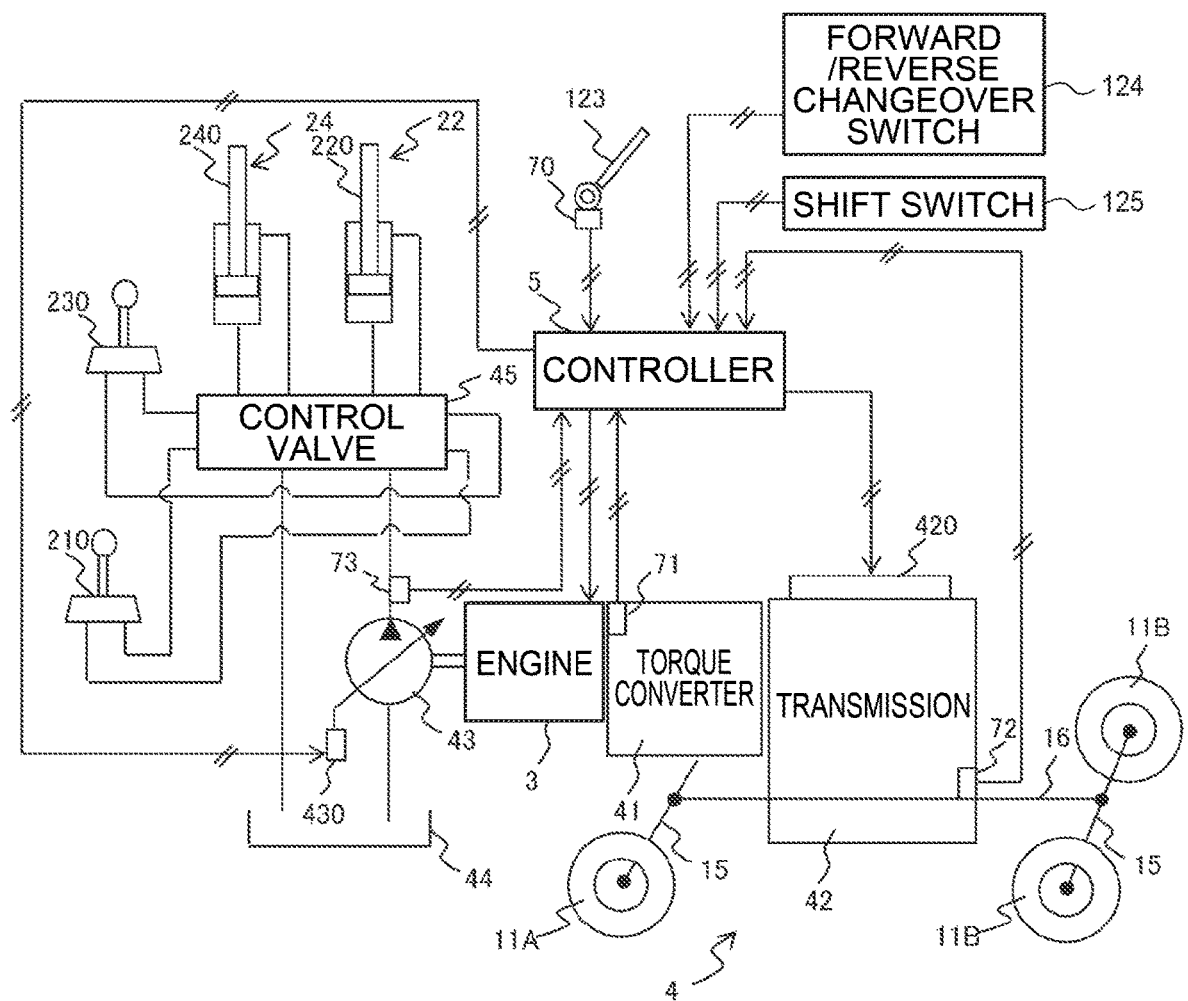
FIG. 4 illustrates a hydraulic circuit and an electric circuit of a wheel loader according to a first embodiment.
Figure 5:
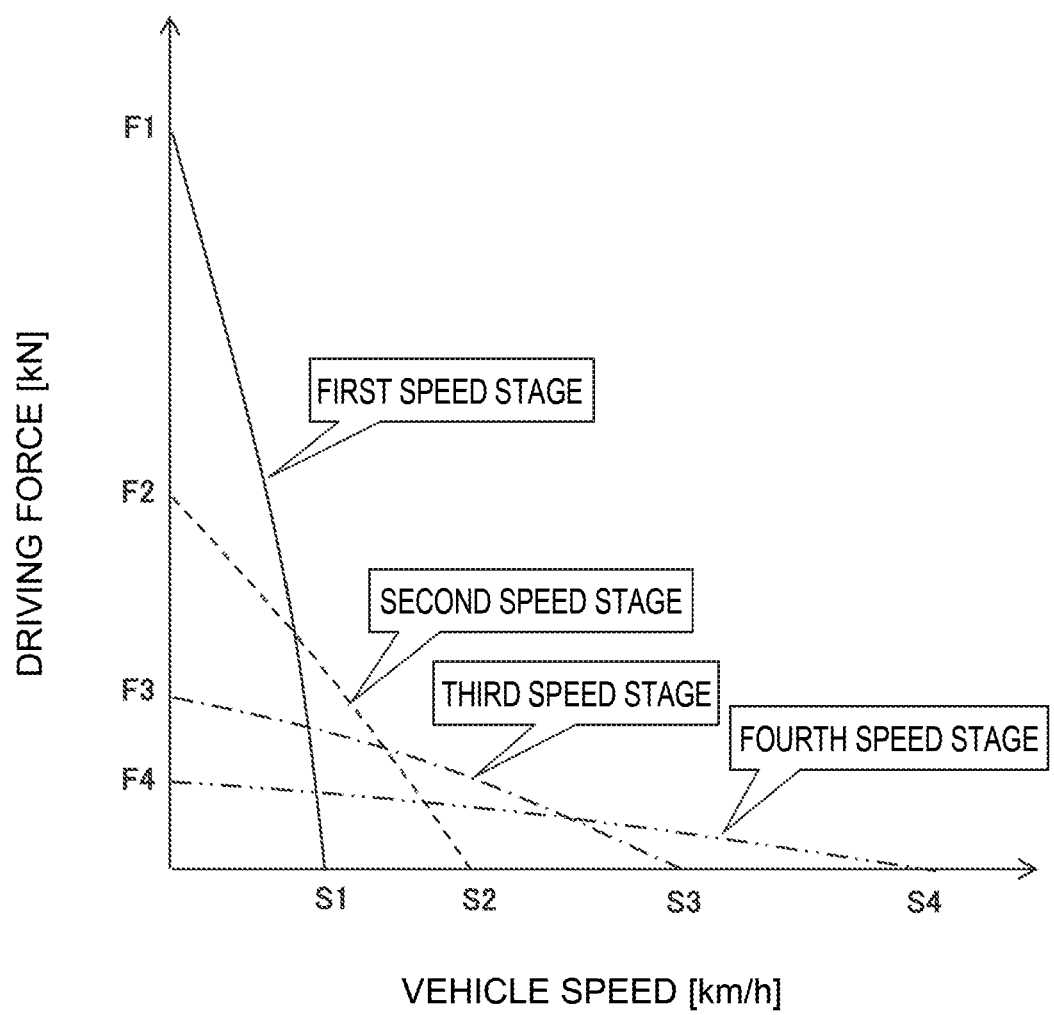
FIG. 5 illustrates a graph showing the relationship between the maximum vehicle speed and driving force for each speed stage.

FIG. 4 illustrates a hydraulic circuit and an electric circuit of the wheel loader 1 according to the first embodiment. FIG. 5 illustrates a graph showing the relationship between the maximum vehicle speed and driving force for each speed stage. FIG. 6 illustrates a graph showing the relationship between the step-on amount of the accelerator pedal and target engine rotational speed.

The wheel loader 1 according to the present embodiment is configured to control traveling of the vehicle body by the torque converter type traveling drive device 4. As illustrated in FIG. 4, the traveling drive device 4 includes an engine 3, a torque converter 41 of which an input shaft is connected to an output shaft of the engine 3, a transmission 42 connected to an output shaft of the torque converter 41, and a controller 5 for controlling each device such as the engine 3.

The torque converter 41 is a hydraulic clutch constituted by an impeller, a turbine, and a stator, and has the function to increase the output torque with respect to the input torque, that is, the function to set the torque ratio (=output torque/input torque) to 1 or more. This torque ratio decreases as the torque converter speed ratio (=output shaft rotational speed/input shaft rotational speed), which is the ratio of the rotational speed of the input shaft of the torque converter 41 and the rotational speed of the output shaft thereof, increases. Thereby, the rotational speed of the engine 3 is changed and then transmitted to the transmission 42.

The transmission 42 is a transmission capable of switching a speed stage between a plurality of speed stages, and changes the rotational speed of the output shaft of the torque converter 41. In the present embodiment, the transmission 42 has four speed stages as illustrated in FIG. 5. Each of the speed stages is respectively set such that the maximum vehicle speed increases in the order of the first speed stage, the second speed stage, the third speed stage, and the fourth speed stage (S1<S2<S3<S4), and the maximum driving force increases in the order of the fourth speed stage, the third speed stage, the second speed stage, and the first speed stage (F4<F3<F2<F1).

Here, the "first speed stage" is a speed stage corresponding to a low speed stage to be selected during excavation work of the wheel loader 1. The "second speed stage" is a speed stage to be selected when the wheel loader 1 travels toward a dump truck during a loading operation (raise and run operation). The "third speed stage" and the "fourth speed stage" are speed stages to be selected such as when the wheel loader 1 travels along a conveyance path. FIG. 5 illustrates the first speed stage by a solid line, the second speed stage by a broken line, the third speed stage by a one-dot dashed line, and the fourth speed stage by a two-dot dashed line, respectively.

The first to fourth speed stages are switched by selecting one of them with the shift switch 125. When the operator selects a desired speed stage with the shift switch 125, a speed stage signal relating to the selected speed stage is output from the shift switch 125 to the controller 5. Then, the controller 5 outputs the speed stage signal to a transmission control unit 420. The transmission control unit 420 includes solenoid valves respectively corresponding to each of the first to fourth speed stages, and upon receiving a speed stage signal, the solenoid valve corresponding to this speed stage signal is driven to make hydraulic oil act on a clutch of the transmission 42. As a result, a clutch corresponding to the desired speed stage is engaged and the speed stage is switched.

The speed stages can be switched automatically without using the shift switch 125. In this case, a signal is output from the controller 5 to the transmission control unit 420 so as to change the vehicle speed at an optimum speed in accordance with the step-on amount of the accelerator pedal 123 using the torque converter speed ratio as a parameter.

Traveling direction of the wheel loader 1, in other words, forward direction movement or reverse direction movement is switched in accordance with the engagement of the clutches of the transmission 42. The forward direction movement and the reverse direction movement are switched by the forward/reverse changeover switch 124. When the operator switches the forward/reverse changeover switch 124 to a position corresponding to the forward direction movement, a forward/reverse changeover signal indicating the forward direction movement is output to the controller 5, and the controller 5 outputs a command signal to the transmission control unit 420 so as to bring a forward direction movement clutch of the transmission 42 into an engaged state. When the transmission control unit 420 receives a command signal relating to the forward direction movement, a clutch control valve provided in the transmission control unit 420 is actuated to bring the forward direction movement clutch into an engaged state, and thereby the traveling direction of the vehicle body is switched to the forward direction. Switching the vehicle body to the reverse direction movement is performed in the same manner.

In the torque converter type traveling drive device 4, firstly, when the operator steps on the accelerator pedal 123, the engine 3 rotates, and the input shaft of the torque converter 41 rotates with the rotation of the engine 3. Then, the output shaft of the torque converter 41 rotates in accordance with the set torque converter speed ratio, and the output torque from the torque converter 41 is transmitted to the front wheels 11A and the rear wheels 11B via the transmission 42, a propeller shaft 16, and an axle 15, which makes the wheel loader 1 travel.

The step-on amount of the accelerator pedal 123 is detected by a step-on amount sensor 70 and input to the controller 5. As illustrated in FIG. 6, the step-on amount of the accelerator pedal 123 is proportional to the target engine rotational speed, and the target engine rotational speed increases as the step-on amount of the accelerator pedal 123 increases. By utilizing this proportional relationship, a command signal in accordance with the target engine rotational speed corresponding to the step-on amount which has been input to the controller 5 is output from the controller 5 to the engine 3.

The rotational speed of the engine 3 is controlled based on the target engine rotational speed. Accordingly, when the step-on amount of the accelerator pedal 123 is great, the rotational speed of the output shaft of the torque converter 41 increases and thus the vehicle speed increases. As illustrated in FIG. 4, the rotational speed of the engine 3 is detected by a first rotational speed sensor 71 provided on the output shaft side of the engine 3, and the vehicle speed is detected by a second rotational speed sensor 72 as the rotational speed of the propeller shaft 16.

Figure 6:
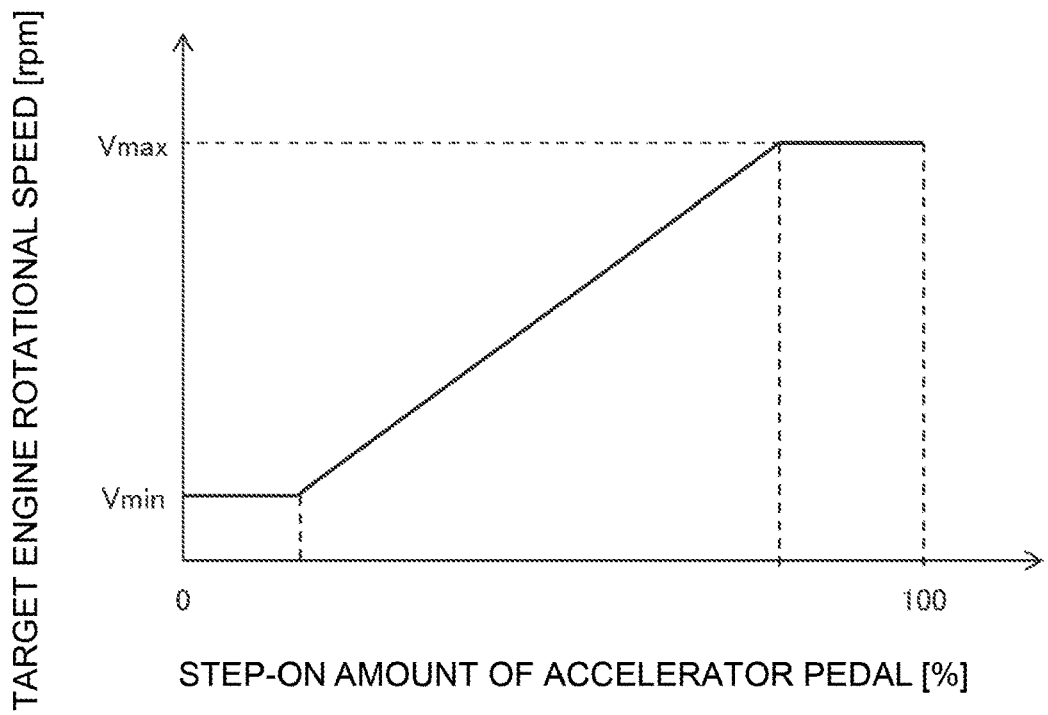
FIG. 6 illustrates a graph showing the relationship between the step-on amount of an accelerator pedal and target engine rotational speed.

In FIG. 6, on a predetermined region (range of 0% to 20% or 30%) in which the step-on amount of the accelerator pedal 123 is small, the target engine rotational speed is set to be maintained at the minimum target engine rotational speed Vmin regardless of the step-on amount of the accelerator pedal 123, while on a predetermined region (range of 70% or 80% to 100%) in which the step-on amount of the accelerator pedal 123 is great, the target engine rotational speed is set to be maintained at the maximum target engine rotational speed Vmax regardless of the step-on amount of the accelerator pedal 123. These settings can be arbitrarily changed.

Drive System of Front Working Device 2

In the following, within the drive system of the wheel loader 1, the drive system of the front working device 2 will be described with reference to FIGS. 4 and 7.

Figure 7:
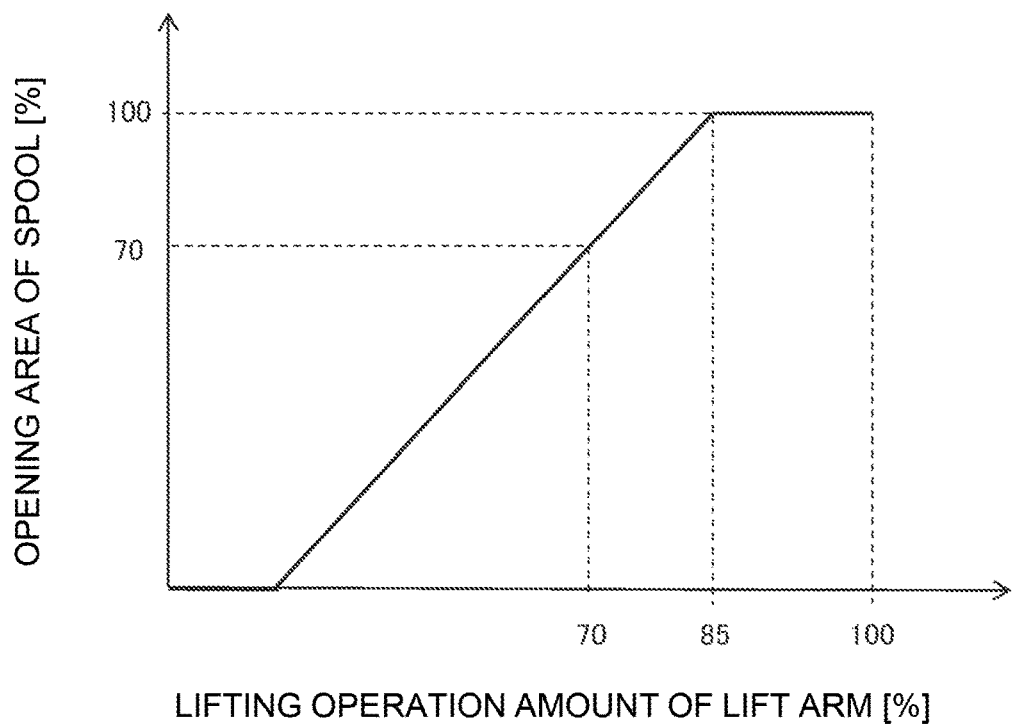
FIG. 7 illustrates a graph showing the relationship between the lifting operation amount of a lift arm and an opening area of a spool.

FIG. 7 illustrates a graph showing the relationship between the lifting operation amount of a lift arm and an opening area of a spool.

As illustrated in FIG. 4, the wheel loader 1 is driven by the engine 3, and includes the working device hydraulic pump 43 for supplying hydraulic oil to the front working device 2, a hydraulic oil tank 44 for storing the hydraulic oil, a lift arm operation lever 210 for operating the lift arm 21, a bucket operation lever 230 for operating the bucket 23, and a control valve 45 for controlling flow of pressure oil supplied from the working device hydraulic pump 43 to the lift arm cylinders 22 and the bucket cylinder 24, respectively.

The working device hydraulic pump 43 is a swash plate type or a swash shaft type variable displacement hydraulic pump in which the displacement volume is controlled in accordance with the tilt angle. The tilt angle is adjusted by a regulator 430 in accordance with a command signal output from the controller 5. The discharge pressure from the working device hydraulic pump 43 is detected by a pressure sensor 73, and a signal relating to the detected discharge pressure is output to the controller 5.

For example, when the operator operates the lift arm operation lever 210 in the direction of moving up the lift arm 21, pilot pressure corresponding to its operation amount is generated. This pilot pressure corresponds to the lifting operation amount of the lift arm 21 by the lift arm operation lever 210.

The generated pilot pressure acts on the control valve 45, and a spool in the control valve 45 strokes in accordance with the pilot pressure. The hydraulic oil discharged from the working device hydraulic pump 43 flows into the lift arm cylinders 22 via the control valve 45, and the rods 220 of the lift arm cylinders 22 are extended thereby.

As illustrated in FIG. 7, the lifting operation amount [%] of the lift arm 21 is proportional to the opening area [%] of the spool of the control valve 45, and when the lifting operation amount of the lift arm 21 increases, the opening area of the spool also increases. When the operator operates the lift arm operation lever 210 largely in the direction of moving up the lift arm 21, the amount of hydraulic oil flowing into the lift arm cylinders 22 increases, and thus the rods 220 are rapidly extended.

In FIG. 7, when the lifting operation amount of the lift arm 21 is in the range of 0% to 20%, the spool is not opened and the opening area is 0% (dead band). When the lifting operation amount of the lift arm 21 is in the range of 85% to 100%, the opening area of the spool is constant at 100%, and a full lever operation state is maintained.

With respect to the operation of the bucket 23, similarly to the operation of the lift arm 21, pilot pressure generated in accordance with the operation amount of the bucket operation lever 230 acts on the control valve 45, and thereby the opening area of the spool of the control valve 45 is controlled, so that the amount of hydraulic oil flowing into and out from the bucket cylinder 24 is adjusted.

Although not illustrated in FIG. 4, each operation amount (pilot pressure) sensor for detecting the lowering operation amount of the lift arm 21 and the tilting/dumping operation amount of the bucket 23, respectively, is also provided on each conduit of the hydraulic circuit.

As described above, the engine 3 is a drive source of the traveling drive device 4, and also serves as a drive source of the front working device 2. Accordingly, the total output torque with respect to the actual rotational speed of the engine 3 is the sum of the input torque of the working device hydraulic pump 43 with respect to the actual rotational speed of the engine 3 and the input torque of the torque converter 41 with respect to the actual rotational speed of the engine 3. In the excavation work, the work efficiency can be improved by appropriately adjusting the balance between the driving force of the front working device 2 and the traveling drive force. Therefore, the input torque of the working device hydraulic pump 43 and the maximum traction force of the wheel loader 1 are controlled by the controller 5.

Configuration and Function of Controller 5

In the following, the configuration and function of the controller 5 will be described with reference to FIGS. 8 to 13.

Figure 8:
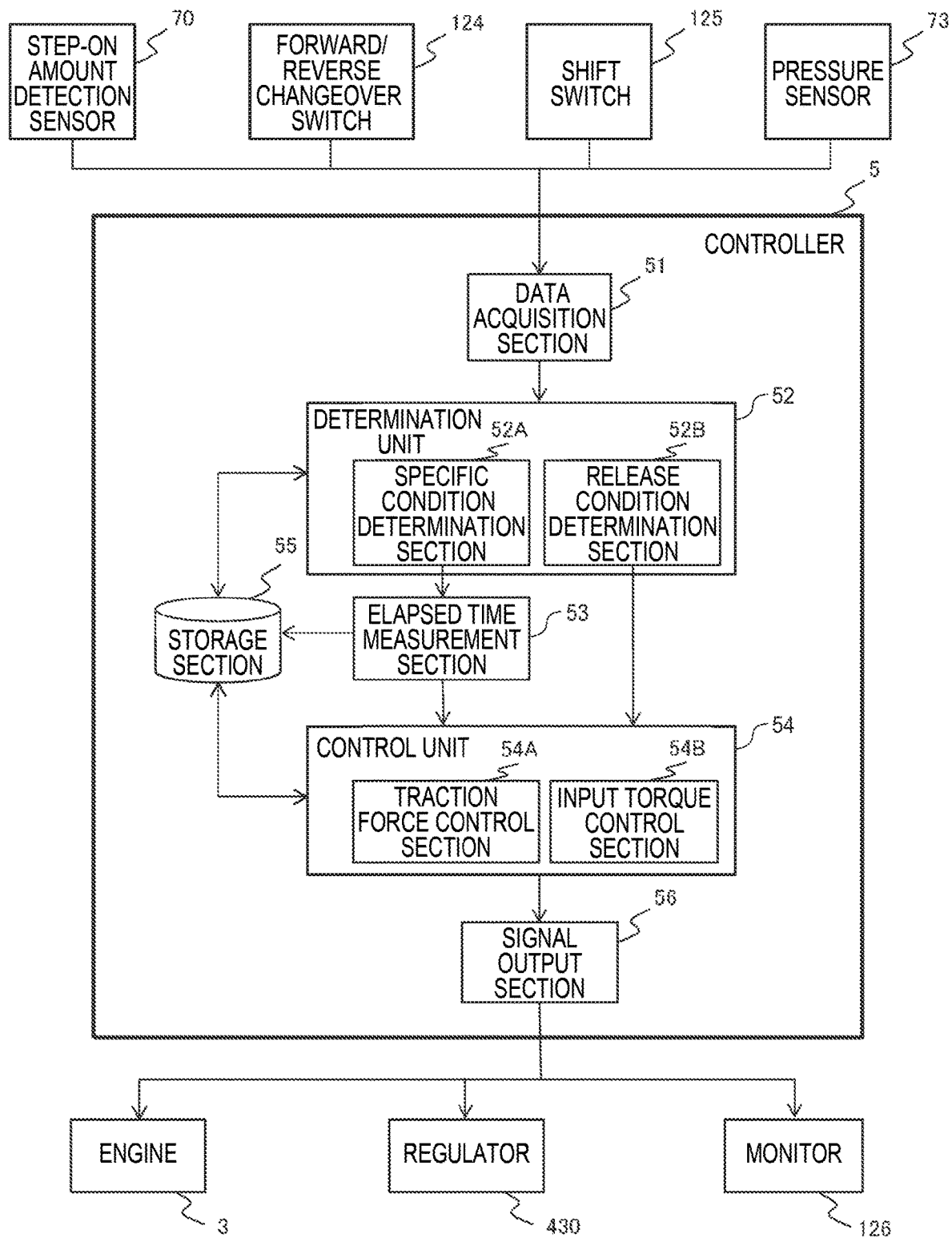
FIG. 8 is a functional block diagram illustrating the function of a controller.
Figure 9:
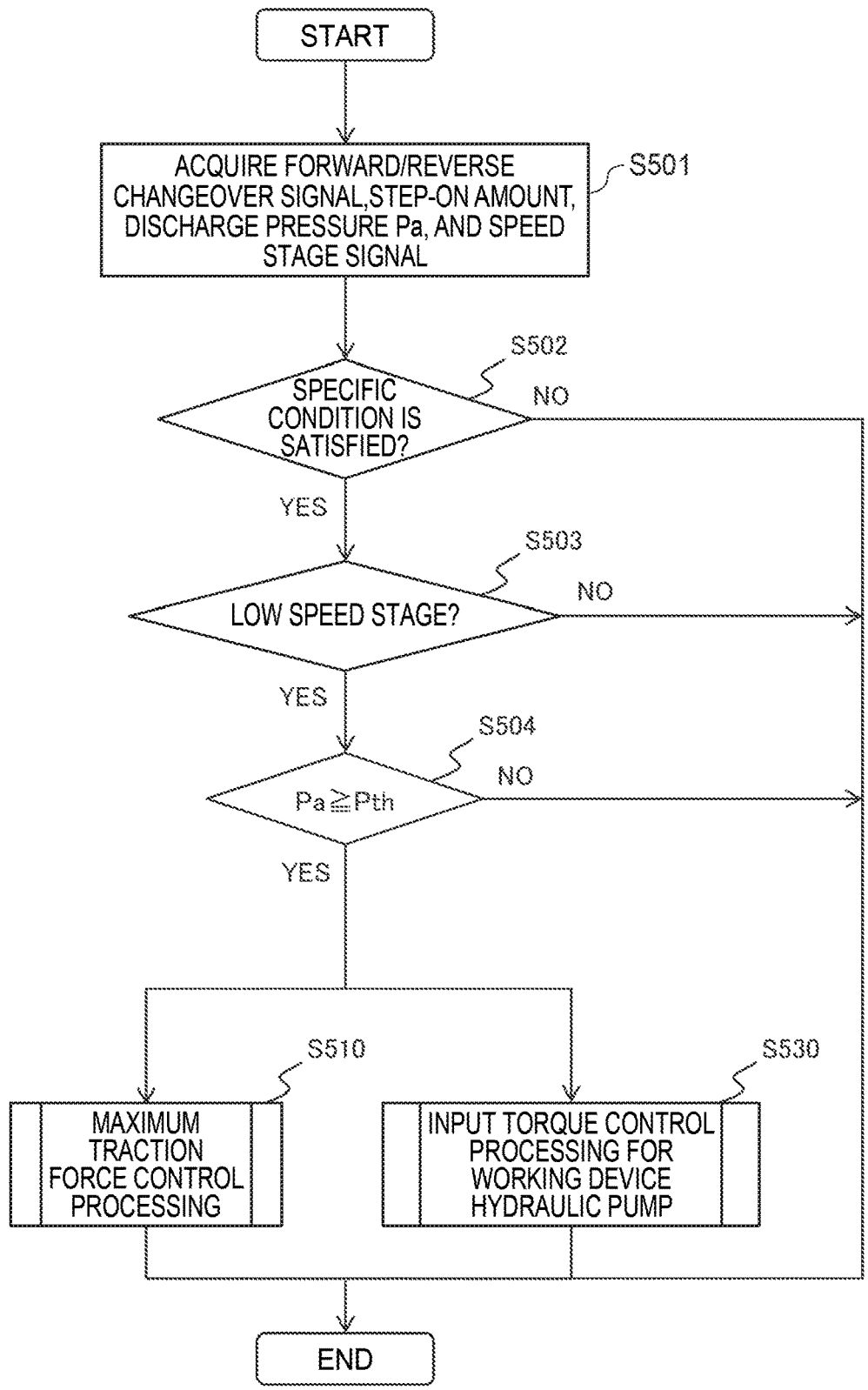
FIG. 9 illustrates a flowchart showing an overall flow of processing executed by the controller.
Figure 10:
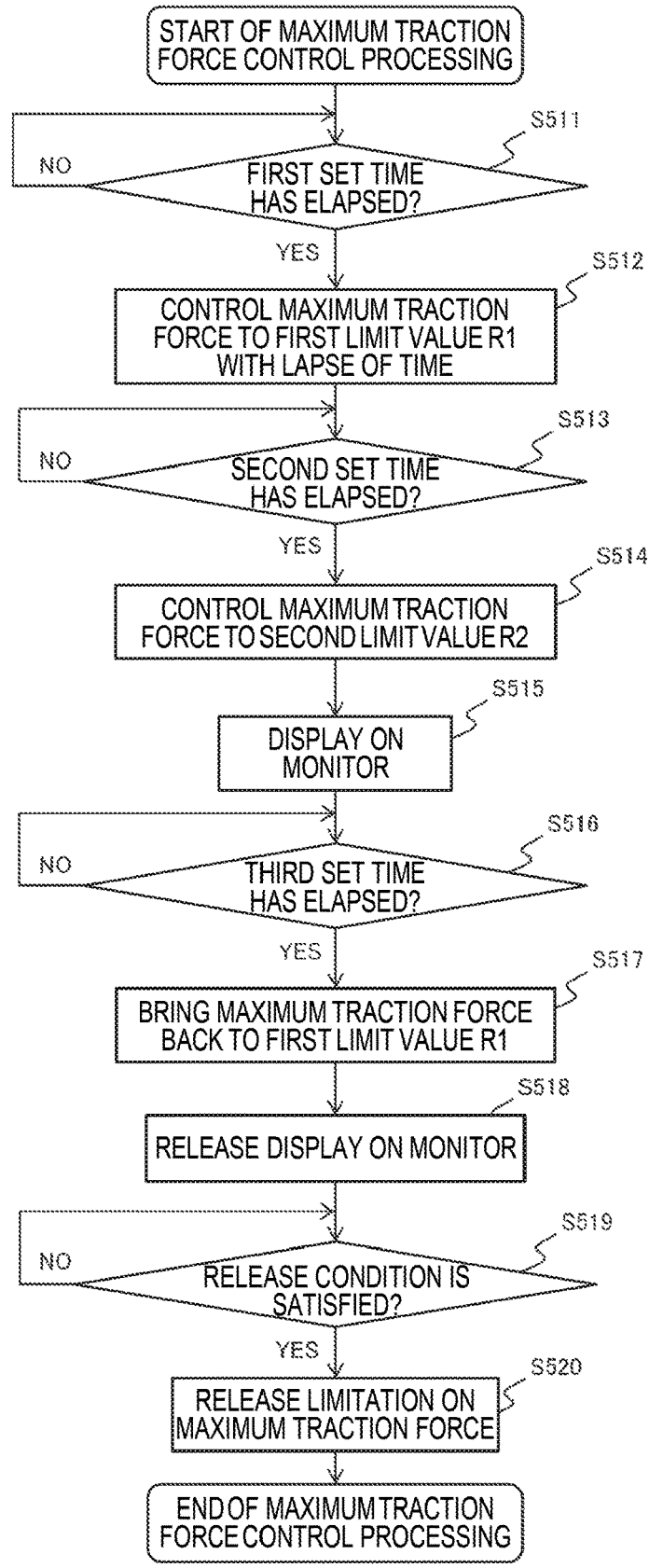
FIG. 10 illustrates a flowchart showing a flow of maximum traction force control processing executed by the controller.
Figure 11:
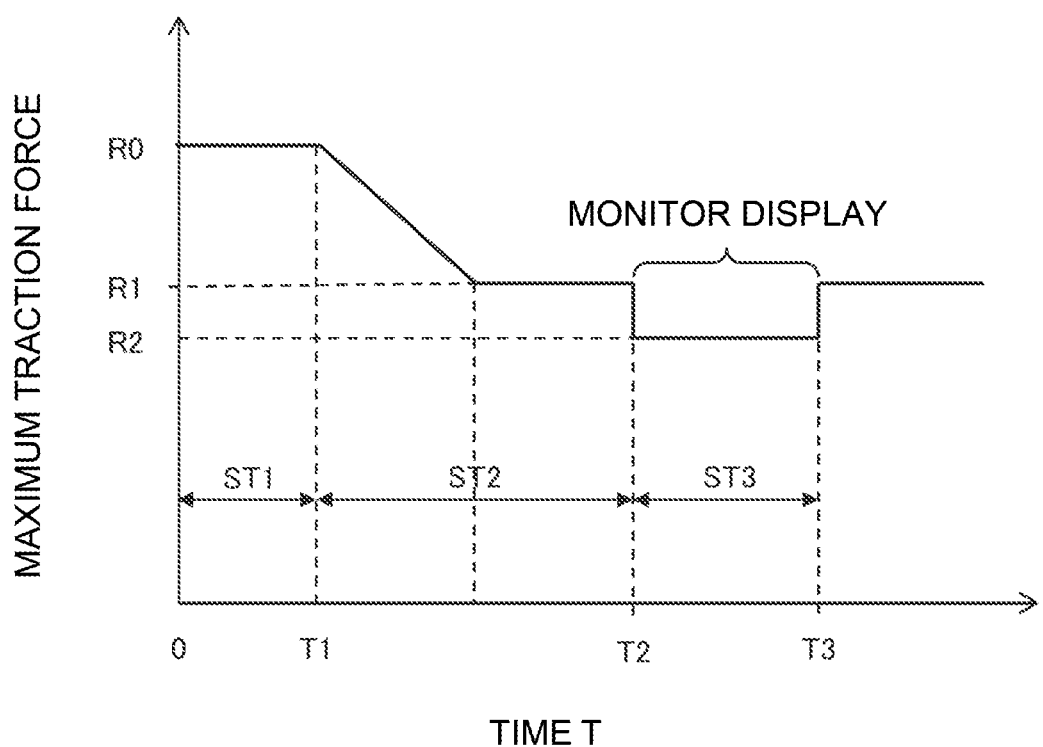
FIG. 11 illustrates a graph showing the temporal transition of the maximum traction force.
Figure 12:
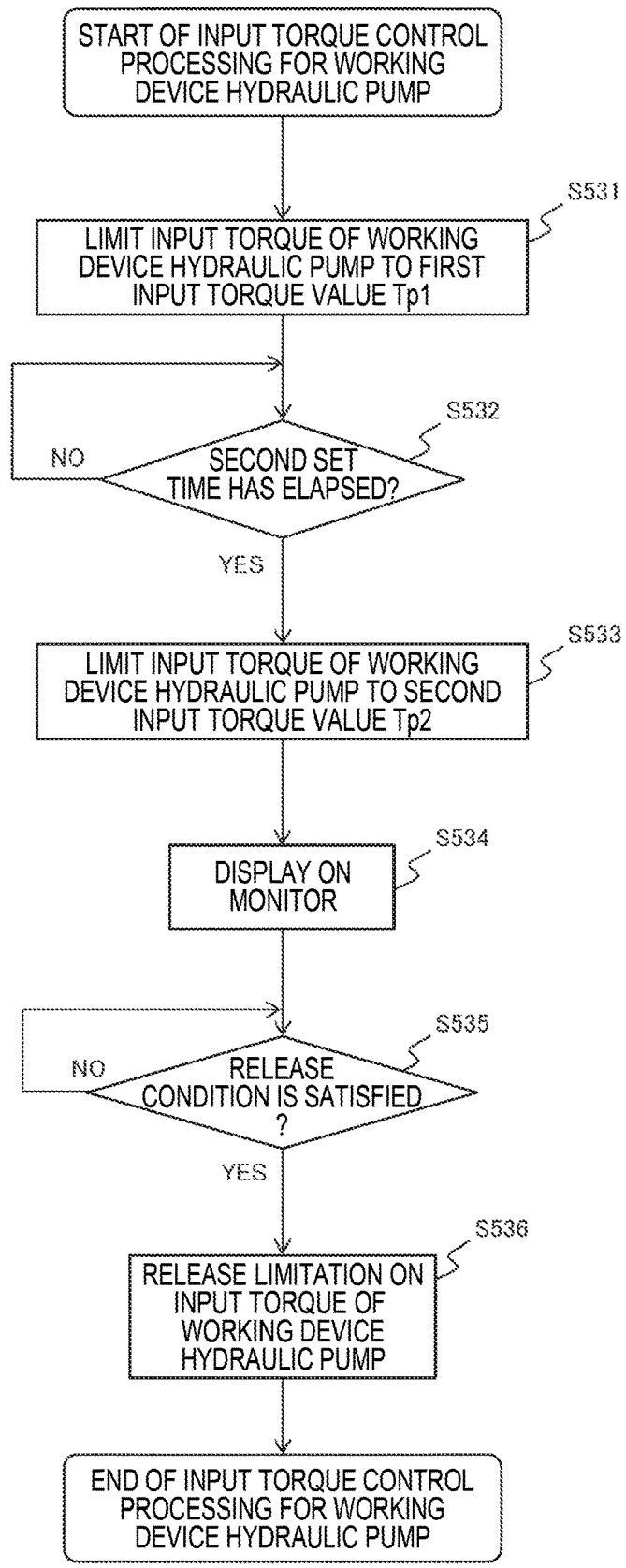
FIG. 12 illustrates a flowchart showing a flow of input torque control processing for a working device hydraulic pump executed by the controller.
Figure 13:
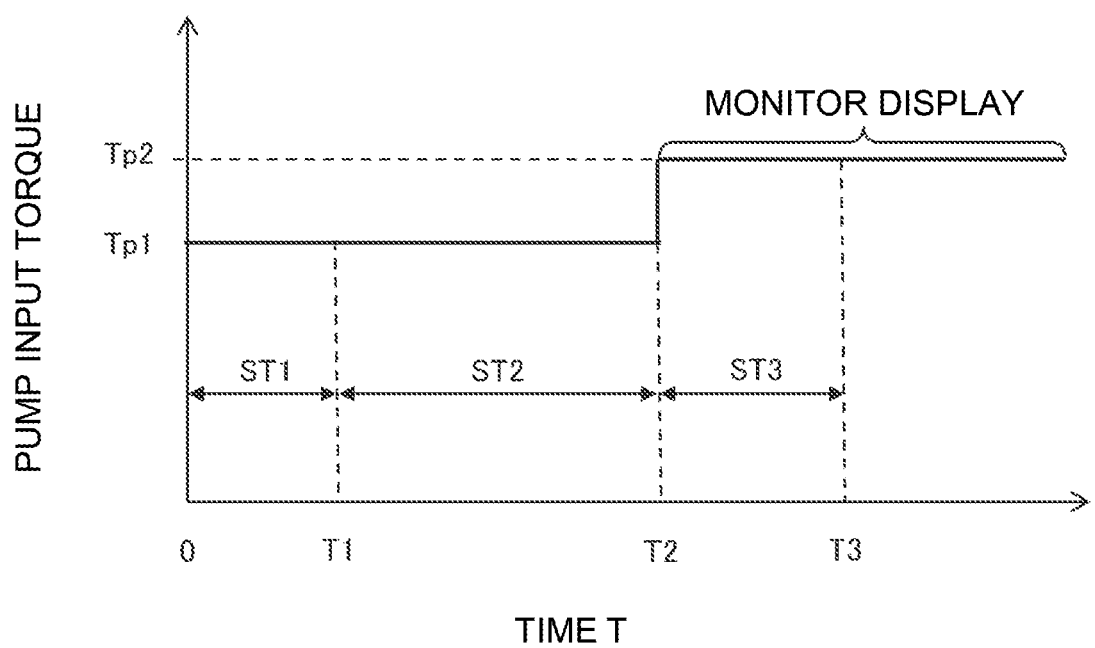
FIG. 13 illustrates a graph showing the temporal transition of the input torque of the working device hydraulic pump.

FIG. 8 is a functional block diagram illustrating the function of the controller 5. FIG. 9 illustrates a flowchart showing an overall flow of processing executed by the controller 5. FIG. 10 illustrates a flowchart showing a flow of maximum traction force control processing executed by the controller 5. FIG. 11 illustrates a graph showing the temporal transition of the maximum traction force. FIG. 12 illustrates a flowchart showing a flow of input torque control processing for a working device hydraulic pump executed by the controller 5. FIG. 13 illustrates a graph showing the temporal transition of the input torque of the working device hydraulic pump.

The controller 5 is constituted by a CPU, a RAM, a ROM, an input I/F, and an output I/F which are connected to each other via a bus. Various operation devices such as the forward/reverse changeover switch 124 and the shift switch 125, and various sensors such as the step-on amount sensor 70 and the pressure sensor 73 are connected to the input I/F. The engine 3, the regulator 430 of the working device hydraulic pump 43, the monitor 126, etc. are connected to the output I/F.

In this hardware configuration, the CPU reads out an arithmetic program (software) stored in a recording medium such as a ROM or an optical disk, expands it on the RAM, and executes the expanded arithmetic program. Thereby, the arithmetic program and the hardware are operated in cooperation, which realizes the function of the controller 5.

In the present embodiment, the controller 5 is described as a computer configured by a combination of software and hardware. Meanwhile, the present invention is not limited to this configuration but as an example of the configuration of another computer, an integrated circuit that realizes the function of an arithmetic program executed on the side of the wheel loader 1 may be used.

As illustrated in FIG. 8, the controller 5 includes a data acquisition section 51, a determination section 52, an elapsed time measurement section 53, a control section 54, a storage section 55, and a signal output section 56.

The data acquisition section 51 acquires data relating to a forward/reverse changeover signal from the forward/reverse changeover switch 124, the step-on amount of the accelerator pedal 123 detected by the step-on amount sensor 70, the discharge pressure Pa of the working device hydraulic pump 43 detected by the pressure sensor 73, and the speed stage signal output from the shift switch 125.

The determination section 52 includes a specific condition determination section 52A configured to determine whether a specific condition for specifying the excavation work of the wheel loader 1 is satisfied, and a release condition determination section 52B configured to determine whether a release condition for releasing the excavation work of the wheel loader 1 is satisfied. Both the specific condition determination section 52A and the release condition determination section 52B determine the respective conditions based on the forward/reverse changeover signal from the forward/reverse changeover switch 124, the step-on amount of the accelerator pedal 123 from the step-on amount sensor 70, and the discharge pressure Pa of the working device hydraulic pump 43 from the pressure sensor 73.

Here, the "specific condition" represents a condition for specifying the series of work illustrated in FIGS. 3(a) to 3(c), which is the excavation work performed by the wheel loader 1. The "release condition" represents a condition for releasing the excavation work of the wheel loader 1 when the specific condition is not continuously satisfied. In this connection, a "case in which the specific condition is not continuously satisfied" refers to a case in which the excavation work is stopped or interrupted halfway by the operation of the operator or a case in which the excavation work is completed.

Each of the forward/reverse changeover switch 124 and the step-on amount sensor 70 is an aspect of a traveling state sensor for detecting the traveling state of the wheel loader 1, and the pressure sensor 73 is one aspect of an operation state sensor for detecting the operation state of the front working device 2. That is, the determination section 52 determines the specific condition and the release condition based on the traveling state of the wheel loader 1 detected by the traveling state sensor and the operation state of the front working device 2 detected by the operation state sensor.

In the present embodiment, the traveling state of the vehicle body is determined based on the forward/reverse changeover signal output from the forward/reverse changeover switch 124 and the step-on amount of the accelerator pedal 123 detected by the step-on amount sensor 70. Meanwhile, the present invention is not limited to this but the traveling state of the vehicle body may be determined comprehensively based on each of the traveling states detected by a plurality of other traveling state sensors mounted on the vehicle body. Similarly, in the present embodiment, the operation state of the front working device 2 is determined by the discharge pressure Pa of the working device hydraulic pump 43 detected by the pressure sensor 73. Meanwhile the present invention is not limited to this but the operation state of the front working device 2 may be determined by, for example, detecting the pilot pressure acting on the lift arm cylinders 22 and the bucket cylinder 24.

The elapsed time measurement section 53 measures an elapsed time from the start of the excavation work performed by the wheel loader 1. The control section 54 includes a traction force control section 54A configured to control the maximum traction force of the wheel loader 1 in accordance with the elapsed time measured by the elapsed time measurement section 53, and an input torque control section 54B configured to control the input torque of the working device hydraulic pump 43 in accordance with the elapsed time measured by the elapsed time measurement section 53. In the following, there are cases in which the "maximum traction force of the wheel loader 1" is simply referred to as the "maximum traction force" and the "input torque of the working device hydraulic pump 43" simply referred to as the "input torque".

The storage section 55 stores a predetermined set value Pth relating to the discharge pressure of the working device hydraulic pump 43, a predetermined first set time ST1 relating to the elapsed time from the start of the excavation work, a predetermined second set time ST2 and a predetermined third set time ST3, a predetermined first limit value R1 relating to the maximum traction force and a predetermined second limit value R2 which is smaller than the predetermined first limit value R1 (R2<R1), and a predetermined first input torque value Tp1 relating to the input torque and a predetermined second input torque value Tp2 which is greater than the predetermined first input torque value Tp1 (Tp2>Tp1), respectively. In the following, the term "predetermined" will be omitted from these values stored in the storage section 55.

Here, the "first set time ST1" is a time corresponding to the work of thrusting the bucket 23 into the ground 100 while making the vehicle body advance (see the state illustrated in FIG. 3(a)). The "second set time ST2" is a time corresponding to the work of scooping the excavated object by tilting the bucket 23 (see the state illustrated in FIG. 3(b)). The "third set time ST3" is a time corresponding to the work of moving up the bucket 23 in a state in which the excavated object is loaded thereon, in other words, a time corresponding to the lifting operation of the lift arm 21 (see the state illustrated in FIG. 3(c)). Accordingly, in FIGS. 11 and 13, T=0 represents the start of the excavation work, T=T1 represents the start of the tilting operation of the bucket 23, and T=T2 represents the start of the lifting operation of the lift arm 21.

The signal output section 56 outputs a command signal in accordance with the processing executed by the traction force control section 54A to the engine 3, and outputs a command signal in accordance with the processing executed by the input torque control section 54B to the regulator 430 of the working device hydraulic pump 43.

The signal output section 56 outputs, to the monitor 126, a display signal for displaying a state in which the maximum traction force is limited to the second limit value R2 (see FIG. 11) based on a limited state by the traction force control section 54A, and outputs, to the monitor 126, a display signal for displaying a state in which the input torque of the working device hydraulic pump 43 is controlled to the second input torque value Tp2 (see FIG. 13) based on a controlled state by the input torque control section 54B.

In the following, a flow of the specific processing executed by the controller 5 will be described.

As illustrated in FIG. 9, firstly, the data acquisition section 51 acquires the forward/reverse changeover signal from the forward/reverse changeover switch 124, the step-on amount of the accelerator pedal 123 from the step-on amount sensor 70, the discharge pressure Pa of the working device hydraulic pump 43 from the pressure sensor 73, and the speed stage signal from the shift switch 125 (step S501).

Secondly, the specific condition determination section 52A determines whether the wheel loader 1 satisfies the specific condition based on the forward/reverse changeover signal, the step-on amount of the accelerator pedal 123, and the discharge pressure Pa of the working machine pressure pump 43 which are acquired in the step S501 (step S502).

When it is determined in step S502 that the specific condition is satisfied (step S502/YES), the specific condition determination section 52A determines whether the speed stage signal acquired in step S501 corresponds to the "low speed stage" (step S503).

When it is determined in step S503 that the speed stage corresponds to the "low speed stage" (step S503/YES), the specific condition determination section 52A determines whether the discharge pressure Pa of the working device hydraulic pump 43 acquired in step S501 is equal to or greater than the set value Pth read from the storage section 55 (step S504).

When it is determined in step S504 that the discharge pressure Pa of the working device hydraulic pump 43 is equal to or greater than the set value Pth (Pa≥Pth) (step S504/YES), the controller 5 proceeds to the maximum traction force control processing (step S510) for the wheel loader 1 and the input torque control processing (step S530) for the working device hydraulic pump 43.

On the other hand, when it is determined in step S502 that the specific condition is not satisfied (step S502/NO), when it is determined in step S503 that the speed stage does not correspond to the "low speed stage" (step S503/NO), and when it is determined in step S504 that the discharge pressure Pa of the working device hydraulic pump 43 is not equal to or greater than the predetermined set value Pth, in other words, when it is determined in step S504 that the discharge pressure Pa of the working device hydraulic pump 43 is less than the predetermined set value Pth (Pa<Pth) (step S504/NO), the controller 5 ends the processing.

As described above, in the present embodiment, the specific condition determination section 52A determines that the specific condition is satisfied when the speed stage of the transmission 42 is the "low speed stage" and the discharge pressure Pa of the working device hydraulic pump 43 is equal to or greater than the set value Pth (Pa≥Pth), which makes it possible to more accurately determine the excavation work performed by the wheel loader 1. In this connection, the controller 5 does not necessarily perform the processing of step S503 and the processing of step S504, but may proceed to the processing of step S510 and the processing of step S530 at least when it is determined YES in step S502.

Hereinafter, with reference to FIGS. 10 and 11, the maximum traction force control processing (step S510) for the wheel loader 1 will be described.

In the maximum traction force control processing (step S510) for the wheel loader 1, firstly, the elapsed time measurement section 53 measures whether the first set time ST1 has elapsed from the start of the excavation work (when it is determined in step S502 that the specific condition is satisfied; time T=0) (step S511).

When it is determined in step S511 that the elapse of the first set time ST1 from the start of the excavation work (time T=0) has been measured (step S511/YES), the traction force control section 54A limits the maximum traction force from an initial value R0 to the first limit value R1 with a lapse of time during a period of time (=T2−T1) from the elapse of the first set time ST1 (time T=T1) to the elapse of the second set time ST2 (time T=T2) (step S512).

In the present embodiment, as illustrated in FIG. 11, the maximum traction force is gradually limited from the initial value R0 to the first limit value R1 during a time of about half of the second set time ST2, and thereafter remains constant at the first limit value R1 until the second set time ST2 elapses (time T=T2). Meanwhile, the present invention is not limited to this but the maximum traction force may be gradually limited from the initial value R0 to the first limit value R1 over the entire time of the second set time ST2.

When the elapse of the first set time ST1 from the start of the excavation work (time T=0) is not measured in step S511 (step S511/NO), the controller 5 does not proceed to the subsequent step S512 until the first set time ST1 elapses from the start of the excavation work (time T=0) (step S511/YES).

Next, the elapsed time measurement section 53 measures whether the second set time ST2 has further elapsed from the elapse of the first set time ST1 (time T=T1) (step S513). When it is determined in step S513 that the elapse of the second set time ST2 further from the elapse of the first set time ST1 (time T=T1) has been measured (step S513/YES), the traction force control section 54A limits the maximal traction force from the first limit value R1 to the second limit value R2 (<R1) (step S514).

As illustrated in FIG. 11, a time when the second set time ST2 further elapses (time T=T2) from the elapse of the first set time ST1 (time T=T1) is a timing when the tilting operation of the bucket 23 is finished and the lifting operation of the lift arm 21 is started. By decreasing the maximum traction force from the first limit value R1 to the second limit value R2 at this timing (decreasing the maximum traction force by two steps from the initial value R0), the maximum traction force becomes smaller than that in the case of the first limit value R1, which makes it easy to move up the lift arm 21.

This is because, while the reaction force against the traction force acts on the lift arm 21 and prevents the lifting operation thereof, this reaction force is suppressed more than in the case of the first limit value R1, and thereby the lifting force of the lift arm 21 becomes greater. As a result, the lifting speed of the lift arm 21 increases, which makes it easy to move up the bucket 23 in a short time even in a state in which an object is loaded thereon.

When the elapse of the second set time ST2 from the elapse of the first set time ST1 (time T=T1) is not measured in step S513 (step S513/NO), the controller 5 does not proceed to the subsequent step S514 until the second set time ST2 elapses from the elapse of the first set time ST1 (time T=T1) (step S513/YES).

The signal output section 56 outputs a display signal to the monitor 126 in accordance with the limited state by the traction force control section 54A (step S515). As a result, the display unit 126A of the monitor 126 displays that the maximum traction force of the wheel loader 1 is limited to the second limit value R2, so that the operator can confirm that the wheel loader 1 is in the limited state and can recognize the timing of the limitation by the controller 5.

Next, the elapsed time measurement section 53 measures whether the third set time ST3 has further elapsed from the elapse of the second set time ST2 (time T=T2) (step S516). When it is determined in step S516 that the elapse of the third set time ST3 further from the elapse of the second set time ST2 (time T=T2) has been measured (step S516/YES), the traction force control section 54A brings the maximal traction force back to the first limit value R1 from the second limit value R2 (step S517).

As illustrated in FIG. 11, a time when the third set time ST3 elapses (time T=T3) after the elapse of the second set time ST2 (time T=T2) is a timing at which the lifting operation of the lift arm 21 is completed. For example, in the case where the second limit value R2 is a value which is somewhat smaller than the first limit value R1, when the maximum traction force is decreased from the first limit value R1 to the second limit value R2, the operator easily feels that the traction force is insufficient (torque release).

In this case, by increasing the maximum traction force from the second limit value R2 to the first limit value R1 around the time when the lifting operation of the lift arm 21 is finished, it is possible to prevent the insufficiency of the traction force. Therefore, in view of preventing insufficiency of the traction force, it is preferable to set a time during which the maximum traction force is limited to the second limit R2, namely the third set time ST3, to be short.

In FIGS. 10 and 11, the traction force control section 54A brings the maximum traction force from the second limit value R2 to the first limit value R1. Meanwhile, the present invention is not limited to this, but the first limit value R1 may not be used as long as the maximum traction force is greater than the second limit value R2.

Then, the signal output section 56 outputs a display signal to the monitor 126 in accordance with the controlled state by the traction force control section 54A (step S518). As a result, the display indicating that the maximum traction force of the wheel loader 1 is limited to the second limit value R2 disappears from the display unit 126A, so that the operator can confirm that the limited state in which the maximum traction force is limited to the second limit value R2 has been released.

Next, the release condition determination section 52B determines whether the specific condition is continuously satisfied, in other words, whether the release condition is satisfied (step S519). When it is determined in step S519 that the release condition is satisfied (step S519/YES), the traction force control section 54A releases the limitation on the maximum traction force to the first limit value R1 and the second limit value R2 (step S520), and the controller 5 ends the processing.

As described above, while the wheel loader 1 is performing work other than the excavation work, by releasing the limitation on the maximum traction force, the maximum traction force can be set to a value greater than the first limit value R1 and the second limit value R2 (for example, the initial value R0). As a result, the vehicle speed can be increased when the vehicle body is made to be driven at full throttle.

When it is determined in step S519 that the release condition is not satisfied (step S519/NO), the controller 5 does not proceed to the subsequent step S520 until the release condition is satisfied (step S519/YES).

In the present embodiment, the determination of the release condition is performed in step S519 which is the last processing of the maximum traction force control processing for the wheel loader 1. Meanwhile, for example, when the excavation work is stopped or interrupted halfway by an operation of the operator, the determination of the release condition is performed in the middle of the process prior to step S519.

Hereinafter, with reference to FIG. 12 and FIG. 13, the input torque control processing (step S530) for the working device hydraulic pump 43 will be described.

In the input torque control processing (step S530) for the working device hydraulic pump 43, firstly, the input torque control section 54B limits the input torque to the first input torque value Tp1 (step S531) when it is determined that the specific condition is satisfied (at the start of excavation work; time T=0).

As illustrated in FIG. 13, by limiting the input torque to the first input torque value Tp1 at an initial stage of the excavation work (the states illustrated in FIGS. 3(a) and 3(b)), the input torque of the engine 3 can be used more on the side of the traveling drive device 4 than on the side of the working device hydraulic pump 43. At this time, since the tilting operation of the bucket 23 is performed slowly, there is no problem even if the input torque of the working device hydraulic pump 43 is limited. That is, the first input torque value Tp1 needs to be a value which does not affect the tilting operation of the bucket 23.

Next, the elapsed time measurement section 53 measures whether the second set time ST2 has further elapsed from the elapse of the first set time ST1 (time T=T1) (step S532). When it is determined in step S532 that the elapse of the second set time ST2 further from the elapse of the first set time ST1 is measured (time T=T1) (step S532/YES), the input torque control section 54B sets the input torque from the first input torque value Tp1 to the second input torque value Tp2 (>Tp1) (step S533).

As described above, the time when the second set time ST2 further elapses (time T=T2) from the elapse of the first set time ST1 (time T=T1) is the timing at which the tilting operation of the bucket 23 is finished and the lifting operation of the lift arm 21 is started. As illustrated in FIG. 13, by setting the input torque to the second input torque value Tp2 which is greater than the first input torque value Tp1 at this timing, the flow rate of the hydraulic oil supplied from the working device hydraulic pump 43 to the lift arm cylinders 22 increases as compared with the case in which the flow rate of the hydraulic oil is limited to the first input torque value Tp1, so that the lifting speed of the lift arm 21 increases.

This is because, since the input torque of the working device hydraulic pump 43 is represented by the product of the discharge pressure of the working device hydraulic pump 43 and the displacement volume (input torque=discharge pressure×displacement volume), the displacement volume with respect to the discharge pressure Pa of the working device hydraulic pump 43 also increases as the input torque increases. As a result, it is possible to shorten the working time of the lifting operation of the lift arm 21, which leads to improvement in the working efficiency.

In the present embodiment, since the maximum traction force is limited from the first limit value R1 to the second limit value R2 and the input torque is increased from the first input torque value Tp1 to the second input torque value Tp2 at the timing at which the tilting operation of the bucket 23 is finished and the lifting operation of the lift arm 21 is started, the lifting speed of the lift arm 21 becomes higher and it is possible to move up the lift arm 21 in a shorter time as compared with a case in which only the maximum traction force is limited and a case in which only the input torque is controlled.

When the elapse of the second set time ST2 further from the elapse of the first set time ST1 (time T=T1) is not measured in step S532 (step S532/NO), the controller 5 does not proceed to the subsequent step S533 until the second set time ST2 elapses from the elapse of the first set time ST1 (time T=T1) (step S532/YES).

The signal output section 56 outputs a display signal to the monitor 126 in accordance with the controlled state by the input torque control section 54B in step S533 (step S534). As a result, the display unit 126A of the monitor 126 displays that the input torque of the working device hydraulic pump 43 is controlled to the second input torque value Tp2, so that the operator can confirm that the input torque of the working device hydraulic pump 43 is in the controlled state and can recognize the timing of the control by the controller 5.

Next, the release condition determination section 52B determines whether the specific condition is continuously satisfied, that is, whether the release condition is satisfied (step S535). When it is determined in step S535 that the release condition is satisfied (step S535/YES), the input torque control section 54B releases the limitation in which the input torque is limited to the first input torque value Tp1 and the second input torque value Tp2 (step S536), and the controller 5 ends the processing.

As described above, while the wheel loader 1 is performing work other than the excavation work, by releasing the limitation on the input torque, the input torque of the working device hydraulic pump 43 can be set to the input torque value which is greater than the first input torque value Tp1 and the second input torque value Tp2, so that the operation speed can be increased when the front working device 2 is operated independently and the operation efficiency can be improved.

When it is determined in step S535 that the release condition is not satisfied (step S535/NO), the controller 5 does not proceed to the subsequent step S536 until the release condition is satisfied (step S535/YES).

In the present embodiment, similarly to the maximum traction force control processing for the wheel loader 1 (step S510), the determination of the release condition is performed in step S536 which is the last processing of the input torque control processing for the working device hydraulic pump 43. Meanwhile, for example, when the excavation work is stopped or interrupted halfway by an operation of the operator, the determination of the release condition is performed in the middle of the processing prior to step S536.

Second Embodiment

Figure 14:
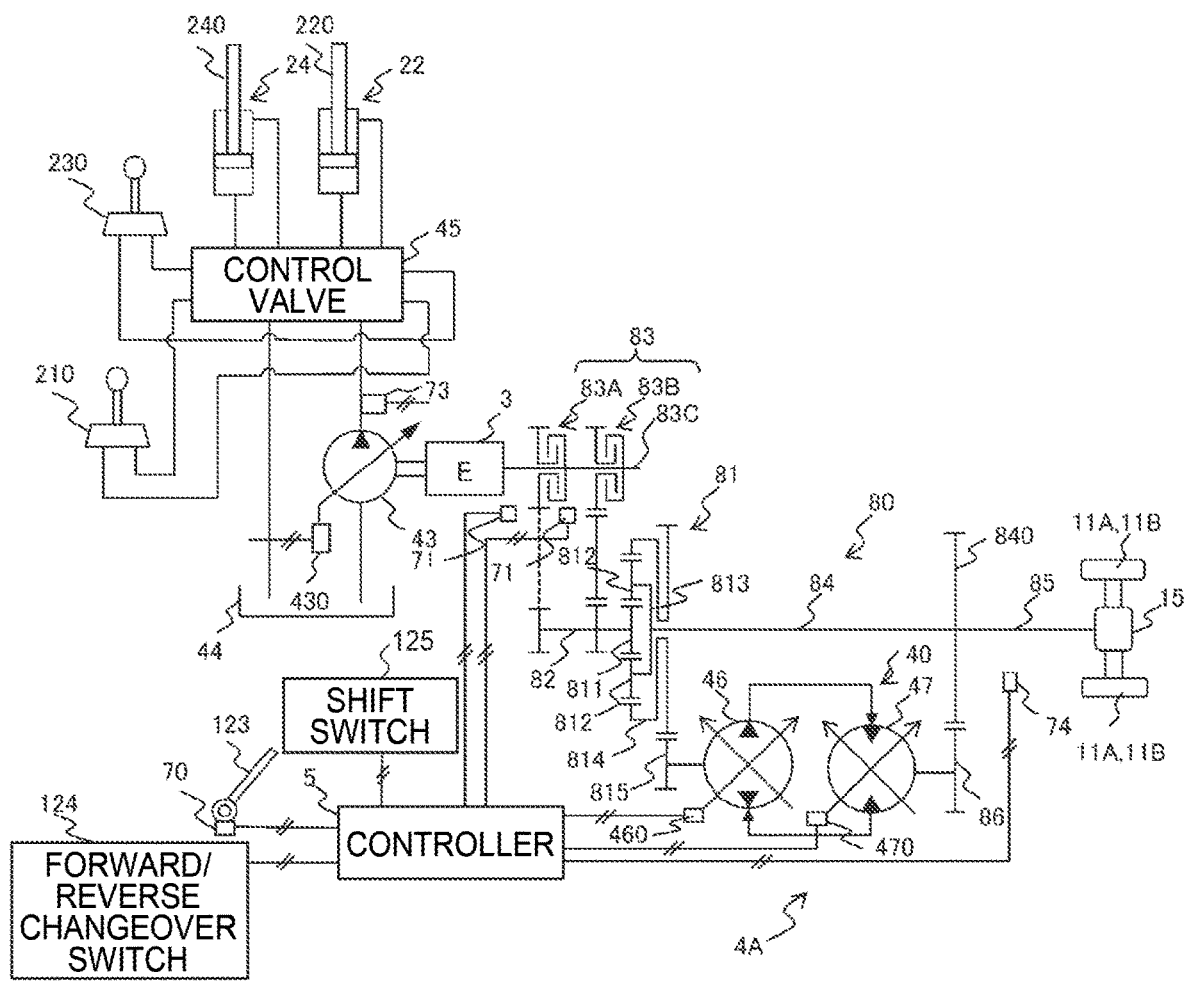
FIG. 14 illustrates a hydraulic circuit and an electric circuit of a wheel loader according to a second embodiment.

Hereinafter, with reference to FIG. 14, the wheel loader 1 according to the second embodiment of the present invention will be described. In FIG. 14, the constituent elements common with those described for the wheel loader 1 according to the first embodiment are provided with the same reference signs, and description thereof is omitted.

FIG. 14 illustrates a hydraulic circuit and an electric circuit of the wheel loader 1 according to the second embodiment.

The wheel loader 1 according to the present embodiment is configured to control the traveling of the vehicle body by an HMT type traveling drive device 4A. The traveling drive device 4A includes the engine 3, an HST pump 46 as a traveling hydraulic pump driven by the engine 3, an HST motor 47 as a traveling hydraulic motor connected to the HST pump 46 in a closed circuit, and a mechanical transmission unit 80. In other words, the traveling drive device 4A is constituted by an HST 40 (HST type traveling drive device), in which the HST pump 46 and the HST motor 47 are connected in a closed circuit, with the mechanical transmission unit 80.

The HST pump 46 is a swash plate type or a swash shaft type variable displacement hydraulic pump in which the displacement volume is controlled in accordance with the tilt angle. The tilt angle is adjusted by a pump regulator 460 in accordance with a command signal output from the controller 5.

The HST motor 47 is a swash plate type or a swash shaft type variable displacement hydraulic motor in which the displacement volume is controlled in accordance with the tilt angle, and transmits the driving force of the engine 3 to the wheels (front wheels 11A and rear wheels 11B). Similarly to the case of the HST pump 46, the tilt angle is adjusted by a motor regulator 470 in accordance with a command signal output from the controller 5.

When the operator steps on the accelerator pedal 123, the engine 3 rotates, and the driving force of the engine 3 is transmitted in parallel to the HST 40 and the mechanical transmission unit 80 via a planetary gear mechanism 81.

The planetary gear mechanism 81 includes a sun gear 811 fixed on an input shaft 82, a plurality of planetary gears 812 engaged with the outer periphery of the sun gear 811, a planetary carrier 813 pivotally supporting the plurality of planetary gears 812, a ring gear 814 engaged with the outer periphery of each of planetary gears 812, and a pump input gear 815 engaged with the outer periphery of the ring gear 814.

The output torque of the engine 3 is transmitted to the input shaft 82 via a clutch device 83 including a hydraulic clutch 83A for forward direction movement, a hydraulic clutch 83B for reverse direction movement, and a clutch shaft 83C, and then transmitted from the input shaft 82 to the planetary gear mechanism 81.

Here, the planetary carrier 813 of the planetary gear mechanism 81 is fixed on an output shaft 84, and accordingly, the driving force of the engine 3 is transmitted to the mechanical transmission unit 80. The driving force of the engine 3 transmitted to the mechanical transmission unit 80 is then transmitted to the axle 15 via a propeller shaft 85 connected to the output shaft 84, which drives the front wheels 11A and the rear wheels 11B.

A pump input gear 815 of the planetary gear mechanism 81 is fixed on a rotation shaft of the HST pump 46, and accordingly, the driving force of the engine 3 is also transmitted to the HST 40. A motor output gear 86 is fixed on a rotation shaft of the HST motor 47 and engages with a gear 840 of an output shaft 84. With this configuration, the driving force of the engine 3 transmitted to the HST 40 is also transmitted to the axle 15 via the propeller shaft 85 connected to the output shaft 84, which drives the front wheels 11A and the rear wheels 11B.

Since the traveling drive device 4A the adjustment is configured to adjust the vehicle speed by continuously increasing or decreasing the discharge flow rate of the HST pump 46, the wheel loader 1 can smoothly start and stop with little impact. Note that the vehicle speed is not necessarily controlled by adjusting the discharge flow rate on the HST pump 46 side, but may be controlled by adjusting the displacement volume on the HST motor 47 side. The vehicle speed is detected by a motor rotational speed sensor 74 as the rotational speed of the HST motor 47.

In the present embodiment, a command signal for controlling the maximum traction force output from the controller 5 is input to the pump regulator 460 of the HST pump 46 or the motor regulator 470 of the HST motor 47. Accordingly, comparing the present embodiment with the first embodiment, only the output destination of the command signal relating to the control of the maximum traction force from the controller 5 is different, but the same operations and effects as in the first embodiment can be obtained in the present embodiment. In the present embodiment, the HMT type traveling drive device 4A has been described. Meanwhile, the present invention is not limited to this but an HST type traveling drive device without a mechanical transmission unit may be used.

Third Embodiment

Figure 15:
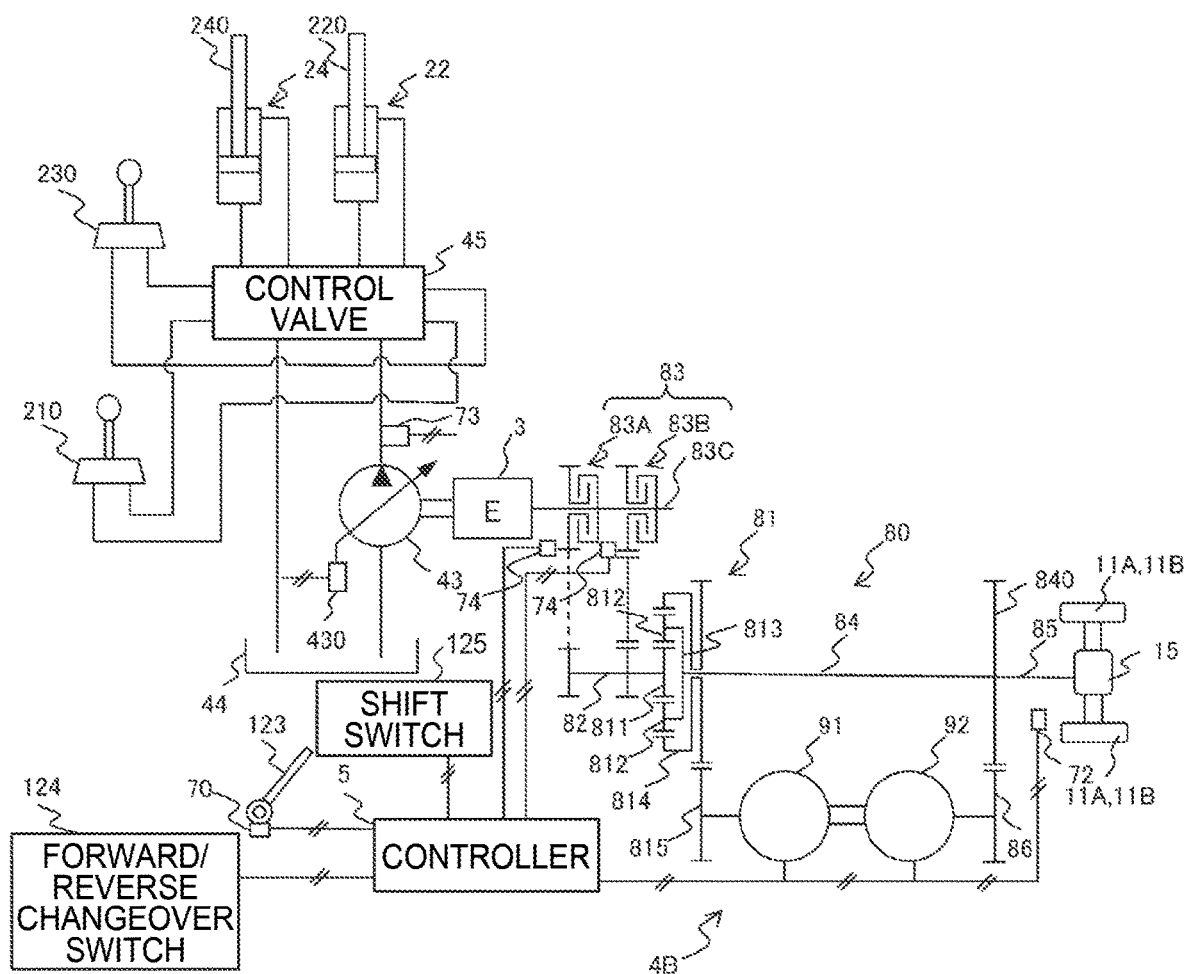
FIG. 15 illustrates a hydraulic circuit and an electric circuit of a wheel loader according to a third embodiment.

Hereinafter, with reference to FIG. 15, the wheel loader 1 according to the third embodiment of the present invention will be described. In FIG. 15, the constituent elements common with those described for the wheel loader 1 according to the first embodiment and the second embodiment are provided with the same reference signs, and description thereof is omitted.

FIG. 15 illustrates a hydraulic circuit and an electric circuit of the wheel loader 1 according to the third embodiment.

The wheel loader 1 according to the present embodiment is configured to control the traveling of the vehicle body by an EMT type traveling drive device 4B. In the EMT traveling drive system, a generator 91 and an electric motor 92 are provided respectively instead of the HST pump 46 and the HST motor 47 of the HMT type traveling drive system 4A described in the second embodiment.

In the present embodiment, the command signal relating to the control of the maximum traction force output from the controller 5 is input to the electric motor 92. Accordingly, comparing the present embodiment with the first embodiment and the second embodiment, only the output destination of the command signal relating to the control of the maximum traction force from the controller 5 is different, but the same operations and effects as in the first embodiment can be obtained in the present embodiment.

The embodiments of the present invention have been described above, meanwhile, the present invention is not limited to these embodiments described above but various modifications are included. For example, the above-described embodiments have been explained in detail in order to clarify the present invention, but are not necessarily limited to those having all the configurations described. In addition, apart of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, in the above-described embodiments, the controller 5 performs both the maximum traction force control processing for the wheel loader 1 and the input torque control processing for the working device hydraulic pump 43 when the specific condition is satisfied. Meanwhile, the present invention is not limited to this, but at least one of the maximum traction force control processing for the wheel loader 1 and the input torque control processing for the working device hydraulic pump 43 may be performed. In the case where the controller 5 performs only the maximum traction force control processing for the wheel loader 1, it is also possible to use a fixed displacement hydraulic pump as the working device hydraulic pump 43.

As described in the embodiments above, there is no limitation on the type of the traveling drive device of the wheel loader 1.

LIST OF REFERENCE SIGNS

1: wheel loader
2: front working device
3: engine
4, 4A, 4B: traveling drive device
5: controller
11A: front wheel (wheels)
11B: rear wheel (wheels)
42: transmission
43: working device hydraulic pump
52A: specific condition determination section
52B: release condition determination section
53: elapsed time measurement section
54A: traction force control section
54B: input torque control section
70: step-on amount sensor (traveling state sensor)
73: pressure sensor (operation state sensor)
124: forward/reverse changeover switch (traveling state sensor)
126: monitor (display device)
Pa: discharge pressure
Pth: predetermined set value
R1: predetermined first limit value
R2: predetermined second limit value
ST1: predetermined first set time
ST2: predetermined second set time
Tp1: predetermined first input torque value
Tp2: predetermined second input torque value

The invention claimed is:
1. A wheel loader comprising:
a vehicle body;
a plurality of wheels provided on the vehicle body;
an engine provided on the vehicle body;
a traveling drive device configured to transmit power from the engine to the plurality of wheels to make the vehicle body travel;
a variable displacement working device hydraulic pump driven by the engine; and
a front working device provided on a front portion of the vehicle body and driven by hydraulic oil supplied from the working device hydraulic pump, wherein
the wheel loader further comprises:
a traveling state sensor configured to detect a traveling state of the wheel loader;
an operation state sensor configured to detect an operation state of the front working device; and
a controller configured to control maximum traction force of the wheel loader and input torque of the working device hydraulic pump, respectively,
the controller includes:
a specific condition determination section configured to determine whether a specific condition for specifying excavation work performed by the wheel loader is satisfied based on the traveling state detected by the traveling state sensor and the operation state detected by the operation state sensor;
an elapsed time measurement section configured to measure an elapsed time from start of the excavation work performed by the wheel loader;
a traction force control section configured to control the maximum traction force of the wheel loader; and
an input torque control section configured to control the input torque of the working device hydraulic pump,
the traction force control section is configured to, in a case where the specific condition determination section determines that the specific condition is satisfied and the elapsed time measurement section measures that a predetermined first set time has elapsed from the start of the excavation work, limit the maximum traction force of the wheel loader to a predetermined first limit value with a lapse of time while a predetermined second set time elapses from the elapse of the predetermined first set time, and
the input torque control section is configured to:
in a case where the specific condition determination section determines that the specific condition is satisfied, limit the input torque of the working device hydraulic pump to a predetermined first input torque value; and in a case where the elapsed time measurement section measures that the predetermined second set time has elapsed further from the elapse of the predetermined first set time, limit the input torque of the working device hydraulic pump from the predetermined first input torque value to a predetermined second input torque value which is greater than the predetermined first input torque value.

2. The wheel loader according to claim 1, wherein the traction force control section is configured to, in a case where the elapsed time measurement section measures that the predetermined second set time has elapsed further from the elapse of the predetermined first set time, limit the maximum traction force of the wheel loader from the predetermined first limit value to a predetermined second limit value which is smaller than the predetermined first limit value.

3. The wheel loader according to claim 1, wherein the traveling drive device includes a transmission capable of switching a speed stage between a plurality of speed stages, and the specific condition determination section determines that the specific condition is satisfied in a case where the speed stage of the transmission is low speed stage to be selected during the excavation work and discharge pressure of the working device hydraulic pump is equal to or greater than a predetermined set value.

4. The wheel loader according to claim 1, wherein the controller includes a release condition determination section configured to determine whether a release condition for releasing the excavation work performed by the wheel loader based on the traveling state detected by the traveling state sensor and the operation state detected by the operation state sensor, and the input torque control section is configured to, in a case where the release condition determination section determines that the release condition is satisfied, release limitation in which the input torque of the working device hydraulic pump is limited to the predetermined first input torque value and the predetermined second input torque value.

5. The wheel loader according to claim 2, further comprising a display device configured to display information on the maximum traction force of the wheel loader and the input torque of the working device hydraulic pump, respectively, wherein the display device is configured to display, based on a controlled state by the input torque control section, that the input torque of the working device hydraulic pump is controlled to the predetermined second input torque value, and based on a limited state by the traction force control section, display that the maximum traction force of the wheel loader is limited to the predetermined second limit value.

6. A wheel loader comprising:
a vehicle body;
a plurality of wheels provided on the vehicle body;
an engine provided on the vehicle body;
a traveling drive device configured to transmit power from the engine to the plurality of wheels to make the vehicle body travel;
a working device hydraulic pump driven by the engine; and
a front working device provided on a front portion of the vehicle body and driven by hydraulic oil supplied from the working device hydraulic pump, wherein
the wheel loader further comprises:
a traveling state sensor configured to detect a traveling state of the wheel loader;
an operation state sensor configured to detect an operation state of the front working device; and
a controller configured to control maximum traction force of the wheel loader and input torque of the working device hydraulic pump, respectively,
the controller includes:
a specific condition determination section configured to determine whether a specific condition for specifying excavation work performed by the wheel loader is satisfied based on the traveling state detected by the traveling state sensor and the operation state detected by the operation state sensor;
an elapsed time measurement section configured to measure an elapsed time from start of the excavation work performed by the wheel loader; and
a traction force control section configured to control the maximum traction force of the wheel loader, and
the traction force control section is configured to:
in a case where the specific condition determination section determines that the specific condition is satisfied and the elapsed time measurement section measures that a predetermined first set time has elapsed from the start of the excavation work, limit the maximum traction force of the wheel loader to a predetermined first limit value with a lapse of time while a predetermined second set time elapses from the elapse of the predetermined first set time; and
in a case where the elapsed time measurement section measures that the predetermined second set time has elapsed further from the elapse of the predetermined first set time, limit the maximum traction force of the wheel loader from the predetermined first limit value to a predetermined second limit value which is smaller than the predetermined first limit value.

7. The wheel loader according to claim 6, wherein the traction force control section is configured to, in a case where the elapsed time measurement section measures that a predetermined third set time has elapsed further from the elapse of the predetermined second set time and the specific condition determination section determines that the specific condition is continuously satisfied, increase the maximum traction force of the wheel loader from the predetermined second limit value to a value which is greater than the predetermined second limit value, or bring the maximum traction force of the wheel loader back to the predetermined first limit value.

* * * * *